United States Patent [19]

Simon

[11] Patent Number: 4,840,143
[45] Date of Patent: Jun. 20, 1989

[54] PET FOOD-DISPENSER

[75] Inventor: Allen Simon, E. Northport, N.Y.

[73] Assignee: Four Paws Products, Ltd., Hauppauge, N.Y.

[21] Appl. No.: 123,129

[22] Filed: Nov. 20, 1987

[51] Int. Cl.[4] .............................................. A01K 39/00
[52] U.S. Cl. ................................ 119/52 R; D30/121; D30/133; 119/72; 119/77; 222/457; 222/185; 43/131
[58] Field of Search ...................... 119/51.5, 52 R, 72, 119/77, 61, 78; D30/121, 132, 133; 220/20, 293; 215/6, 356; 222/184, 185, 457; 43/131

[56] References Cited

U.S. PATENT DOCUMENTS

| | | | |
|---|---|---|---|
| D. 294,750 | 3/1988 | Atchley | D30/132 |
| 749,098 | 1/1904 | Reynolds | 119/77 |
| 1,069,943 | 8/1913 | Haffey | 119/52 R |
| 1,533,627 | 4/1925 | Averill | 119/77 |
| 1,571,409 | 2/1926 | Hayes | 119/52 R |
| 1,815,964 | 7/1931 | Boyer | 119/77 |
| 1,835,964 | 12/1931 | Pech et al. | 119/77 |
| 1,994,859 | 3/1935 | Langum | 119/61 X |
| 2,369,496 | 2/1945 | Sengbusch | 222/184 |
| 2,573,802 | 11/1951 | Mitchell | 222/457 |
| 2,690,280 | 9/1954 | Henningsen | 222/457 |
| 2,696,803 | 12/1954 | Deffenbaugh | 119/52 R |
| 2,725,663 | 12/1955 | Mullen | 119/52 R |
| 3,720,184 | 3/1973 | Pearce | 119/51.5 |
| 4,034,715 | 7/1977 | Arner | 119/51.5 |
| 4,315,483 | 2/1982 | Scheidler | 119/51.5 X |
| 4,573,434 | 3/1986 | Gardner | 119/77 |
| 4,721,063 | 1/1988 | Atchley | 119/52 R |

FOREIGN PATENT DOCUMENTS

| | | | |
|---|---|---|---|
| 2227819 | 11/1974 | France | 119/77 |
| 2368220 | 6/1978 | France | 119/77 |
| 854785 | 11/1960 | United Kingdom | 119/52 R |

Primary Examiner—Robert Peshock
Assistant Examiner—R. Thomas Price
Attorney, Agent, or Firm—Darby & Darby

[57] ABSTRACT

A storage and dispensing apparatus for dry or liquid pet food of the type including a serving tray and a generally cylindrical storage container detachably secured to the tray so as to extend axially thereabove. The tray is provided with a generally circular opening for receiving the bottom of the storage container, and a flange projects radially into the opening. The flange is interrupted over a predetermined circumferential arc. The bottom of the storage container has a skirt portion that flairs downwardly and outwardly and has an outside diameter which is larger than the inside diameter of the interrupted flange. On the flaired skirt, a pair of diametrically opposed lugs project radially outwardly and each lug has a circumferential dimension which is smaller than the circumferential extent of the interruption in the tray flange. Immediately above the flaired skirt there is provided a downwardly facing annular seat. In order to mount the storage container to the tray, one of the lugs is aligned with the interruption in the tray flange and the storage container is tilted so that the other lug extends under the tray flange. The storage container is then pressed towards the tray so that the flaired skirt portion snaps past the tray flange, so that the flange is captured between the skirt portion and the storage container annular seat. Rotating the storage container with respect to the tray so as to place both lugs under the tray flange will then lock the storage container against withdrawal from the serving tray.

12 Claims, 2 Drawing Sheets

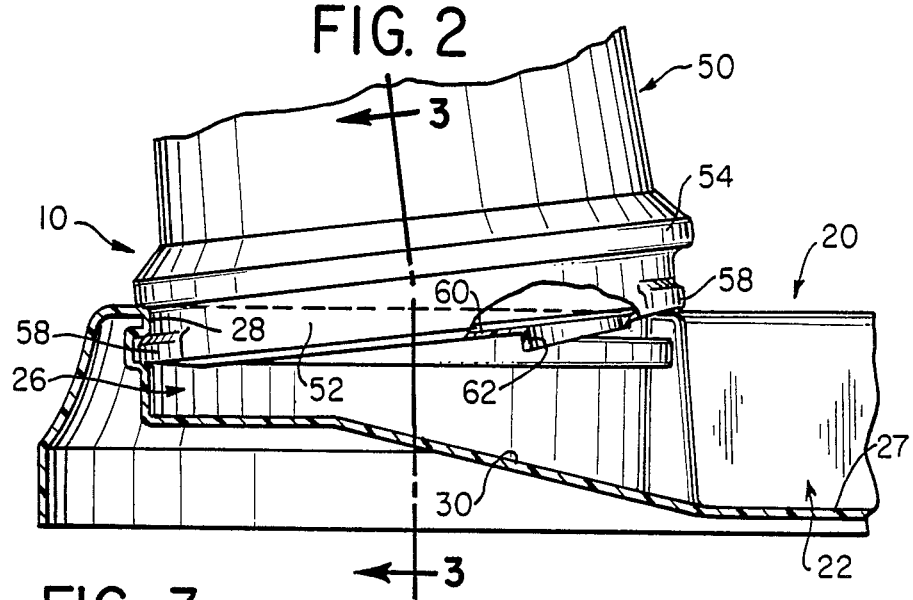
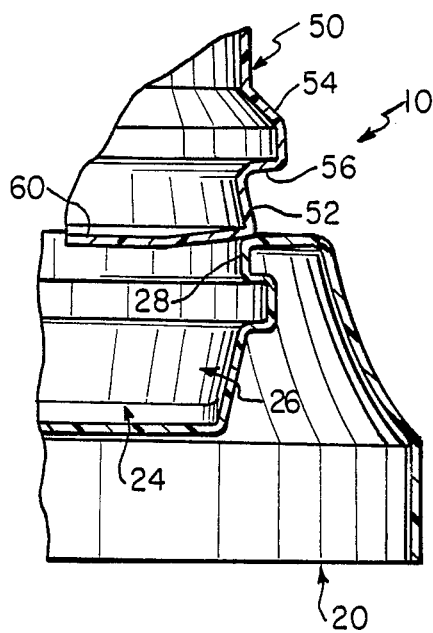
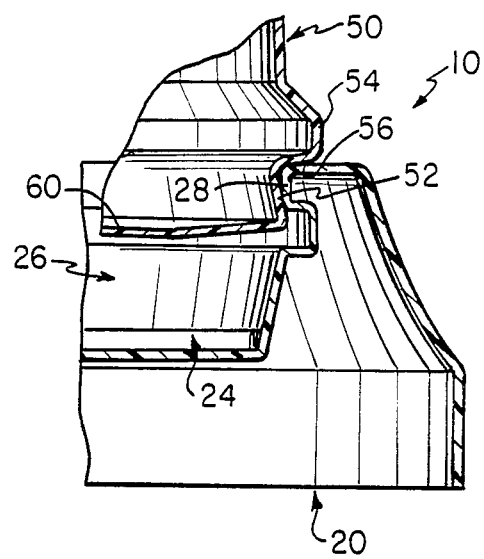

PET FOOD DISPENSER

FIELD OF THE INVENTION

The present application relates generally to dispensing of solids and liquids and, more particularly, concerns an apparatus for storing a quantity of a liquid or solid food for a domestic pet and for gradually dispensing the food over a period of time.

BACKGROUND OF THE INVENTION

Devices for storing and dispensing solid or liquid food for a domestic pet, such as a cat or dog, are well known. A typical device of this type includes an elongated serving tray which is adapted to rest on a flat surface, such as the floor. A hollow storage container is secured to the tray at one end of the tray and is raised above the bottom wall of the tray. An opening is provided in the bottom wall of the storage container to permit a dry or liquid pet food placed inside the container to drop down into the serving tray by force of gravity. As the pet consumes the food from the tray, it is replaced by fresh food from the storage container.

In one type of pet food storage and dispensing apparatus which has been commercially available, the storage container is permanently affixed to the serving tray. Below the storage container, a hole is provided in the bottom wall of the serving tray and it is plugged, for example, with a cork which is inserted from below the serving tray. In order to fill the device with pet food, the entire device must be turned upside down and the cork removed. The pet food can then be introduced through the hole in the bottom wall of the tray to the bottom wall of the storage container and, through the hole therein, into the storage container itself. This filling process tends to become very messy, particularly with a liquid pet food, because it virtually is impossible to avoid spilling some of the food as it is introduced into the device. Furthermore, since the storage container is permanently affixed to the serving tray, the space between the storage container and the serving tray is inaccessible, and it is virtually impossible to clean the device effectively.

In order to permit separation of the storage container and the serving tray, known devices have made provision for detachably securing them by providing a circular opening on the tray with a radially inwardly projecting flange. The container has an outwardly and downwardly flared lower skirt portion which has a larger diameter than the inside diameter of the flange, and a downwardly facing annular seat is provided on the container immediately above the skirt. The container and tray are detachably secured by pressing the skirt past the flange, whereby the flange is captured between the skirt and the annular seat.

The problem with this detachable securement is that, with manufacturing tolerances encountered with the relatively inexpensive plastic sheet materials utilized for these products, a reliable and convenient securement cannot be obtained. If the parts are manufactured to permit convenient assembly and disassembly, they tend to be sufficiently loose for a pet to separate them by applying pressure to the container. Not only will the food then spill and produce a mess, but an intelligent pet will be able to repeat this act at will. Should the parts be manufactured so as to assure a snug enough fit to avoid disassembly by the pet, it becomes difficult for a human to assemble and disassemble the parts, and it becomes more likely that the plastic parts will be damaged through the application of excessive force.

Broadly, it is an object of the present invention to provide a pet food storage and dispensing apparatus for wet and dry pet food which overcomes the shortcomings of known devices in this type. It is specifically an object of the present invention to provide an apparatus of this type which is readily conveniently filled and clean.

It is also an object of the present invention to provide a storage and dispensing apparatus for wet or dry pet food in which the storage container and serving tray are conveniently, easily and quickly disassembled by a human being, but cannot be disassembled by the pet.

It is yet another object of the present invention to provide a storage and dispensing apparatus for wet or dry pet food which is reliable and convenient to use, yet relatively inexpensive in construction.

In accordance with preferred embodiments demonstrating objects and features of the present invention, a storage and dispensing apparatus for dry or liquid pet food comprises a serving tray and a generally cylindrical storage container detachably secured to the tray so as to extend axially thereabove. The tray is provided with a generally circular opening for receiving the bottom of the storage container, and a flange projects radially into the opening. The flange is interrupted over a predetermined circumferential arc. The bottom of the storage container has a skirt portion that flairs downwardly and outwardly and has an outside diameter which is larger than the inside diameter of the interrupted flange. On the flaired bottom portion, there are provided a pair of diametrically opposed, radially outwardly extending lugs, each of which has a circumferential dimension which is smaller than the circumferential extent of the interruption in the tray flange. Immediately above the flaired skirt portion of the container, there is provided a downwardly facing annular seat. In order to mount the storage container to the tray, one of the lugs is aligned with the interruption in the tray flange and the storage container is tilted so that the other lug extends under the tray flange. The storage container is then pressed towards the tray so that the flaired skirt portion snaps past the tray flange, so that the flange is captured between the skirt portion and the storage container annular seat. Rotating the storage container with respect to the tray so as to place both lugs under the tray flange will then lock the storage container against withdrawal from the serving tray.

BRIEF DESCRIPTION OF THE DRAWINGS

The foregoing and further objects, advantages and features of the present invention will be more completely understood from a detailed description of presently preferred, but nonetheless illustrative, embodiments of the present invention, with references being had to the accompanying drawings, in which:

FIG. 2 is a fragmentary left side view with respect to FIG. 1, with portions shown in section to reveal further structural details, the storage container being shown in a position immediately prior to being pressed into the tray;

FIG. 3 is a fragmentary sectional view taken along contour 3—3 in FIG. 2 and looking in the direction of the arrows;

FIG. 4 is a fragmentary sectional view similar to FIG. 3 showing the storage container and serving tray immediately after the storage container the serving tray are snapped together.

DETAILED DESCRIPTION OF PREFERRED EMBODIMENTS

Figure 1:
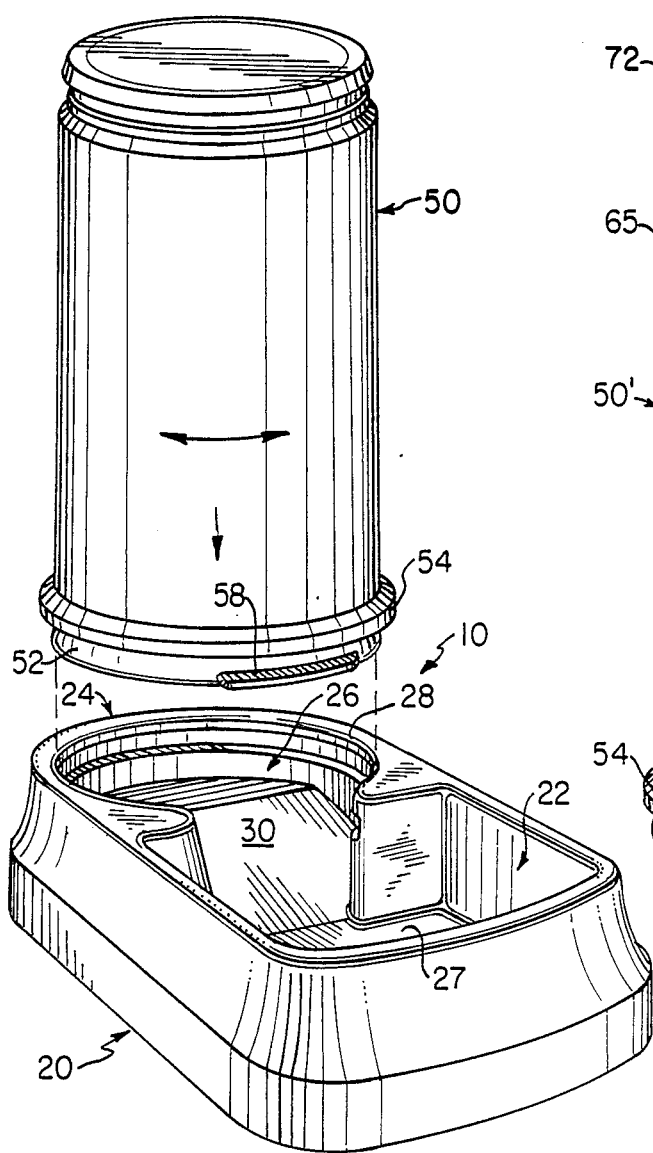
FIG. 1 is a perspective view of a storage and dispensing apparatus for pet food in accordance with the present invention, with the storage container and serving tray shown about to be assembled.

Turning now to the details of the drawings, FIGS. 1-4 illustrate a preferred embodiment of the present invention, in the form of a liquid storage and dispensing apparatus 10 useful for providing water for a domestic pet, such as a cat or a dog, over extending periods of time. Apparatus 10 broadly comprises a serving tray 20, from which the pet may drink water, and a storage container 50, which is filled with water periodically and serves as a reservoir to supply the serving tray 20. Serving tray 20 and storage container 50 are constructed so as to be detachably secured for filling storage container 50 and cleaning the entire apparatus. Preferably, both serving tray 20 and storage container 50 are molded from an inexpensive plastic material.

Serving tray 20 is constructed so as to rest securely on a flat surface, for example, the floor of an apartment or residence. The front of the tray is fashioned into a feeding compartment 22 dimensioned to receive a generous quantity of water and to permit the pet to feed itself by lower its face into compartment 22. At the rear of tray 20, there is provided a receiving compartment 24 for storage container 50, the top of which compartment is fashioned into a generally circular receiving mouth 26 defined by an inwardly projecting, annular flange 28. The walls defining the feeding compartment 22 and the receiving compartment 24 are interrupted at the rear and front of these compartments, respectively, in order to permit communication therebetween. Flange 28 is similarly interrupted. The rear of the receiving compartment 24 is made higher than the bottom wall 26 of the tray, in order to permit the formation of a downwardly and forwardly sloping ramp portion 30, which directs water arriving in the receiving compartment 24 into the serving compartment 22.

Storage container 50 is preferably cylindrical and is large enough to store approximately 2 quarts of water. The bottom of storage container 50 is formed into a downwardly and outwardly sloped flaring portion or skirt 52 which, at its lowermost extreme, has an outside diameter which is somewhat larger than the inside diameter of flange 28 of tray 20. Immediately above skirt 52, container 50 is provided with a flange portion 54, which includes a downwardly directed, annular seating surface 56. On the lower portion of skirt 52, there are provided a pair of diametrically opposed, radially outwardly protruding lugs 58, 58, each of which has a circumferential dimension which does not exceed the interruption in flange 28 of tray 20. In the preferred embodiment, the bottom of wall 60 of the storage container 50 is closed, except for a single aperture 62.

In use, the storage container 50 and serving tray 20 are conveniently separated for cleaning or filling of the container 50. In order to fill the container, it is held upside down, so that it may conveniently be filled from a water faucet or the like, through apertures 62. To assemble serving tray 20 to storage container 50, serving tray 20 is held upside down over storage container 50. One of the lugs 58 is then aligned with the interruption in flange 28, while the other lug is inserted under flange 28 (see FIG. 2). At this point, the bottom of skirt 52 will be in contact with the top of flange 28 (see FIG. 3). If a modest force is asserted to urge tray 20 and container 50 together, the natural resilience of the plastic material from which they are made will permit skirt 52 and flange 28 to deform, whereby they may be "snapped" together as shown in FIG. 4. Container 50 is then rotated relative to tray 20 so as to place both lugs 58, 58 under flange 28. In this position, tray 20 and container 50 are securely attached and may not be separated. In order to separate them, the assembly procedure must be reversed. However, there is no likelihood that a domestic pet could follow such a procedure.

Those skilled in the art will appreciate that, in order for container 50 to be retained within receiving mouth 26, the interruption in flange 28 must be less than 180°. This interruption is preferably substantially less than 180° and is, most preferably, in the range of 45° or less.

Figure 5:
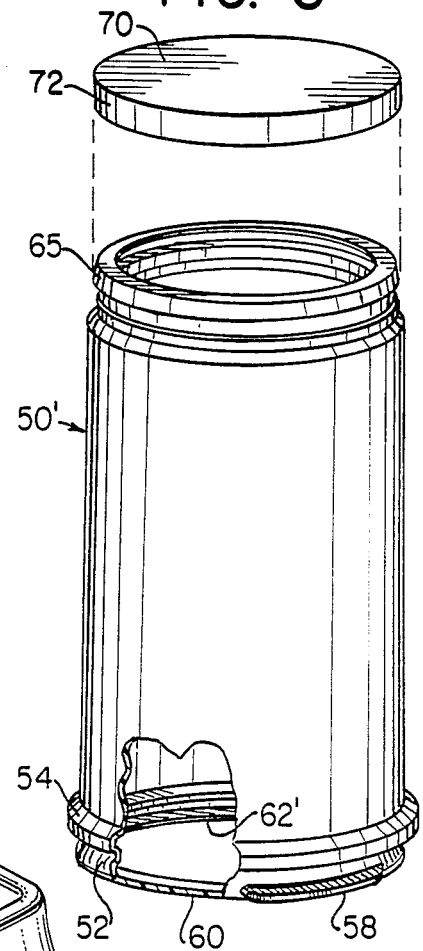
FIG. 5 illustrates an alternate embodiment for the storage container.

FIG. 5 represents an alternate embodiment of storage and dispensing apparatus 10 which is useful with a dry, particulate pet food. Serving tray 20 has been omitted from FIG. 5, because it would be identical in construction to that shown in FIG. 1. Storage container 50, of FIG. 5 is identical, in many respects, to storage container 50 of FIG. 1, and identical elements have been represented by the same reference characters. One difference between containers 50' and 50 is that container 50' has an aperture 62' in bottom wall 60 which covers nearly the entire bottom wall. The larger opening is required for a solid material. In addition, storage container 50' is provided with a detachable top cover 70. This cover is made of a relatively thin plastic material and is therefore quite resilient. In addition, the cover 70 has a radially inwardly directed flange portion 72 at its bottom. Container 50' is provided with an upper flange 65 which is shaped to conform substantially to cover 70 and to have an outside diameter which is equal to the inside diameter of cover 70. Accordingly, cover 70 may be pressed down over flange 65 and flange portion 72 will deform to pass under flange 65, retaining cover 70 in place. Cover 70 may, however, be readily removed from flange 65, to permit introduction of a solid food material, without separating tray 20 and container 50.

Although the preferred embodiments of the invention have been disclosed for illustrative purposes, those skilled in the art will appreciate that many additions, modifications and substitutions are possible, without departing from the scope and spirit of the invention and defined in the accompanying claims.

What is claimed is:

1. A storage and dispensing apparatus of the type including a tray adapted to rest securely on a flat surface and a generally cylindrical storage container extending axially above said tray, comprising:
   an annular, inwardly projecting flange formed on a surface of said tray, said flange being interrupted over a predefined circumferential distance thereof;
   a downwardly and outwardly flaring skirt portion formed near the bottom of said container, the outside diameter of said skirt portion at the point of largest diameter being larger than the inside diameter of said flange;
   a plurality of radially outwardly projecting lug members formed on said skirt so as to project radially outwardly beyond said skirt, at least one of said lug members having a circumferential extent which does not exceed the circumferential extent of the interruption in said flange; and means on said container defining an annular, downwardly facing seat above and proximate to said skirt for engaging said tray from above.

2. An apparatus in accordance with claim 1, said plurality of lug members is a pair of lug members in diametrically opposed relationship.

3. An apparatus in accordance with claim 2, wherein the lug members each occupy a circumferential arc which is less than 180°.

4. An apparatus in accordance with claim 3, wherein at least one of the lug members occupies a circumferential arc which is in the range of 45°.

5. An apparatus in accordance with claim 3, wherein at least one of the lug members occupies a circumferential arc which does not exceed 45°.

6. An apparatus in accordance with claim 1, wherein the lug members each occupy a circumferential arc which is less than 180°.

7. An apparatus in accordance with claim 6, wherein at least one of the lug members occupies a circumferential arc which is in the range of 45°.

8. An apparatus in accordance with claim 6, wherein at least one of the lug members occupies a circumferential arc which does not exceed 45°.

9. An apparatus in accordance with claim 1, wherein said tray further comprises a forward feeding compartment and a rearward receiving compartment for said container, said feeding and receiving compartments being in open communication over a distance equal to the extent of the interruption in said flange.

10. An apparatus in accordance with claim 9, wherein said feeding compartment has a bottom wall and said receiving compartment has a bottom wall which slopes upwardly and rearwardly away from the bottom wall of said feeding compartment.

11. An apparatus in accordance with claim 1, wherein said storage container further comprises a radially outwardly projecting flange member at its top, said apparatus further comprising a cover dimensioned and shaped so that the interior thereof will conform to said flange member, said cover having a closed top and a radially inwardly projecting, resilient flange portion, said flange portion being positioned at a distance below said closed top calculated so that said flange portion passes under the top flange of said container when said cover is pressed down onto said top flange of said container.

12. A method for assembling a storage and dispensing apparatus of the type including a tray adapted to rest securely on a flat surface and a generally cylindrical storage container extending axially above said tray, an annular, inwardly projecting flange formed on a surface of said tray, said flange being interrupted over a predefined circumferential distance thereof; a downwardly and outwardly flaring skirt portion formed near the bottom of said container, the outside diameter of said skirt portion at the point of largest diameter being larger than the inside diameter of said flange; a plurality of radially outwardly projecting lug members formed on said skirt so as to project radially outwardly beyond said skirt, at least one of said lug members having a circumferential extend which does not exceed the circumferential extent of the interruption in said flange; and means on said container defining an annular, downwardly facing seat above and proximate to said skirt for engaging said tray from above, comprising the steps of:

aligning said at least one lug member with said flange interruption;

inserting the other lug member under the flange;

urging said container and said tray towards each other until said skirt snaps past said flange; and rotating said container and said tray relative to each other until each lug member is at least partially under said flange.

* * * * *